(12) United States Patent
Nisbet et al.

(10) Patent No.: US 6,834,304 B1
(45) Date of Patent: Dec. 21, 2004

(54) METHOD AND APPARATUS FOR CREATING A NETWORK AUDIT REPORT

(75) Inventors: Alan D. Nisbet, Ottawa (CA); Andrew W. Leslie, Montréal (CA)

(73) Assignee: Nortel Networks Limited, St. Laurent (CA)

( * ) Notice: Subject to any disclaimer, the term of this patent is extended or adjusted under 35 U.S.C. 154(b) by 739 days.

(21) Appl. No.: 09/740,942

(22) Filed: Dec. 21, 2000

(51) Int. Cl.[7] .............................................. G06F 15/173
(52) U.S. Cl. ....................... 709/224; 709/223; 707/200; 707/201
(58) Field of Search ............................... 709/223–224; 707/200, 201; 714/4, 47–48; 370/907; 398/9–38

(56) References Cited

U.S. PATENT DOCUMENTS

| | | | |
|---|---|---|---|
| 5,608,720 A | * | 3/1997 | Biegel et al. ................ 370/249 |
| 5,617,533 A | * | 4/1997 | Wu et al. ...................... 714/38 |
| 5,937,413 A | * | 8/1999 | Hyun et al. .................. 707/201 |
| 6,141,777 A | * | 10/2000 | Cutrell et al. ................. 714/47 |
| 6,216,169 B1 | * | 4/2001 | Booman et al. ............. 709/246 |
| 6,243,453 B1 | * | 6/2001 | Bunch et al. ........... 379/201.01 |
| 6,327,677 B1 | * | 12/2001 | Garg et al. .................... 714/37 |
| 6,542,905 B1 | * | 4/2003 | Fogel et al. ................. 707/200 |
| 6,625,590 B1 | * | 9/2003 | Chen et al. ..................... 707/1 |

* cited by examiner

*Primary Examiner*—Frantz B. Jean
(74) *Attorney, Agent, or Firm*—L. Anne Kinsman; Borden Ladner Gervais LLP

(57) ABSTRACT

A method and system for auditing an optical network to identify malfunctioning network elements and to generate a report which would allow skilled personnel to quickly and effectively identify areas of functionality of a deployed network element that is operating incorrectly by reading through the report. The method involves reading a network element data file and comparing parameters of the file represented by a network interface command line of the file with specified parameters to determine if the network element is operating within valid operating ranges; determining which parameters of the network interface command line are outside valid operating ranges; creating a network element findings file for findings of parameters of the network interface command line which are outside valid operating ranges; and repeating the foregoing steps for data files of all network elements in the network.

16 Claims, 3 Drawing Sheets

METHOD AND APPARATUS FOR CREATING A NETWORK AUDIT REPORT

FIELD OF THE INVENTION

The present invention relates generally to optical networks. More particularly, the present invention relates to a method and apparatus for auditing the network to identify the operational parameters of network elements and create an audit report.

BACKGROUND OF THE INVENTION

An optical network consists of a number of interconnected elements operating in the synchronous optical network (SONET) layer and optical layer of the network, all of which must be operating correctly and within valid operating parameters. It is especially important that all elements be operating correctly before performing a software upgrade or network reconfiguration. This requires that an audit be performed upon each of the elements in the network.

Creating a network audit report comprises three major processes. The first of these processes typically involves the gathering of network element information by capturing network element information files from the command line user interface (CLUI) of each element. The second involves the evaluation of the captured network element information files to determine if "findings"—i.e. elements which are outside valid operating parameters—have occurred due to performance or configuration issues. The final process calls for the findings to be recorded in a formal report that lists the findings, a probable cause, and corrective procedures. The formal network audit report, upon completion, is submitted to the customer.

A serious problem arises in the second process, namely, the evaluation of the captured network element information files. An experienced engineer familiar with all operating aspects of the network element's configuration and software load can spend upwards of 40 minutes analyzing the data to determine if a network element is operating within properly configured bounds and a typical network may contain 30 to 40 elements.

One approach to addressing this problem is the Preside™ Software Upgrade Management tool of Nortel Networks Corporation. This utility performs a pre-check of the network element s before attempting to perform software upgrade or network reconfiguration. However, the Preside™ tool only performs three checks on the network element and only identifies that a problem exists, not the reason or cause of the problem. It also requires experienced personnel to then troubleshoot the network element to determine what the problem is, which may require three to four hours to completely evaluate a network of 30 to 40 nodes. It further requires an IP address and uses TCP/IP as its means of communicating with the network elements, whereas personnel troubleshooting a network element typically use a modem connection in order to access the network element. Moreover, most network elements do not have an IP address, making them invisible to Preside™. Furthermore, since more than one operations controller can control the network elements in a network, Preside™ must discover what span of control each operations controller has and whether or not the network element is within that operations controller's span of control, if TCP/IP is to be used to communicate to the network element through the operations controller.

It is, therefore, desirable to provide a method of auditing a network to identify the operational parameters of network elements, particularly malfunctioning network elements, and to generate a report which allows skilled personnel to quickly and effectively identify areas of functionality of a deployed network element that is operating incorrectly by reading through the report. This could then be used to determine if the network elements that make up a network's topology are ready for a network reconfiguration or upgrade. If any of the network elements are identified as having a "finding" then those network elements are evaluated and corrective measures effected before a software upgrade or network reconfiguration is executed. Otherwise, the software upgrade or network reconfiguration can fail.

SUMMARY OF THE INVENTION

It is an object of the present invention to obviate or mitigate at least one disadvantage of previous systems and methods for auditing optical networks. In particular, it is an object of the present invention to automate an auditing function, and to generate a report that identifies malfunctioning network elements in a readily understandable format.

In a first aspect, the present invention provides a method of auditing an optical communications network to determine operational states of network elements. The method consists of first retrieving operational data from a plurality of network elements. The data can be retrieved by polling the network elements via a serial connection, using, for example, a modem, or by accessing static data capture files. Next, the operational data is evaluated to determine an operational parameter for a given network element. In a presently preferred embodiment, the operational data is evaluated by processing network interface command lines within data capture files. If the operational parameter is determined to be invalid, it is flagged as an invalid operational parameter. To determine if the operational parameter is invalid, it can be compared to predetermined operational specifications for the given network element. If the operational parameter falls outside a predetermined operating range, it is considered invalid. The evaluation and determination steps are repeated for all operational parameters related to the given network element, and then again for each remaining network element. Once the evaluation is completed, a findings report is generated. The findings report lists any of the plurality of network elements determined to have at least one invalid operational parameter, displays details of each invalid operational parameter, and provides a finding status for each invalid operational parameter.

In a further aspect, there is provided a method of auditing a synchronous optical network to identify malfunctioning network elements, and a computer program product embodying the method. The method commences with entering a directory location for network element data files. The network element data file for a given network element is then retrieved from the directory location, and verified as valid. The valid file is then opened and a network interface command line is read. If the network interface command line is valid, it is processed to determine if operational parameters for the given network element are outside valid predetermined operating ranges. Any operational parameters so determined are flagged and stored in a network element findings file. These steps are repeated for each network element, and a summary findings file is created that encapsulates the network element findings files to provide a report listing any of the plurality of network elements determined to have findings, displaying details of the findings, and providing a finding status for each finding. A computer program product, residing on a computer useable medium and embodying this method is also provided.

In yet another aspect, the present invention provides a computer program product, residing on a computer-useable medium, for auditing an optical communications network to determine operational states of network elements. The computer program product includes a data capture module stored on the computer-useable medium for retrieving operational data from a plurality of network elements via a serial connection, and for storing the operational data in data capture files. An evaluation module is communicatively coupled to the data capture module. The evaluation module evaluates the operational data to determine operational parameters for the plurality of network elements, determines if the determined operational parameters are invalid, and flags the invalid operational parameters. A reporting module communicatively coupled to the evaluation module generates a findings report for the plurality of network elements. The findings report lists any of the plurality of network elements determined to have at least one invalid operational parameter, displays details of the at least one invalid operational parameter, and provides a finding status for the at least one invalid operational parameter.

In still a further aspect, the present invention provides an auditor for auditing an optical communications network to determine operational states of network elements. The auditor consists of a serial connection for communicating with a plurality of network elements in an optical communications network, and a data capture module for retrieving operational data from the plurality of network elements via the modem. The data capture module also stores the operational data in data capture files. An evaluation module evaluates the operational data to determine operational parameters for the plurality of network elements, and to determine if the determined operational parameters are invalid. If the operational parameters are invalid, they are flagged. A reporting module can then generate a findings report for the plurality of network elements. The findings report lists any of the plurality of network elements determined to have at least one invalid operational parameter, displays details of the at least one invalid operational parameter, and provides a finding status for the at least one invalid operational parameter.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for auditing an optical communications network, at the SONET and optical layers. An auditor, embodied in a software application, queries, or polls, each network element using a modem connection to collect data related to each element, determines if each element is operating within expected operational parameters, and creates a report that permits a user to view the operational parameters associated with each network element, and identify those elements that may be malfunctioning. Preferably, the auditor examines all the data that is present for each network element, judges the data as valid or invalid, and generates a report, or summary, that indicates those instances where a network element's operational parameters are judged to be invalid. A user is then able to study the audit report to determine which network elements are not performing as expected. The auditor of the present invention is intended to operate on all network elements that are running software loads and to determine if an element is operating within established parameters based on the specifications provided for each given software release. While the invention is described herein in terms of SONET elements and optical network elements, it will be understood by those of skill in the art that present invention can be applied to other network element types that have software loads and can be polled remotely, or can download their operational data or operational parameters to readable data structures.

Figure 1:
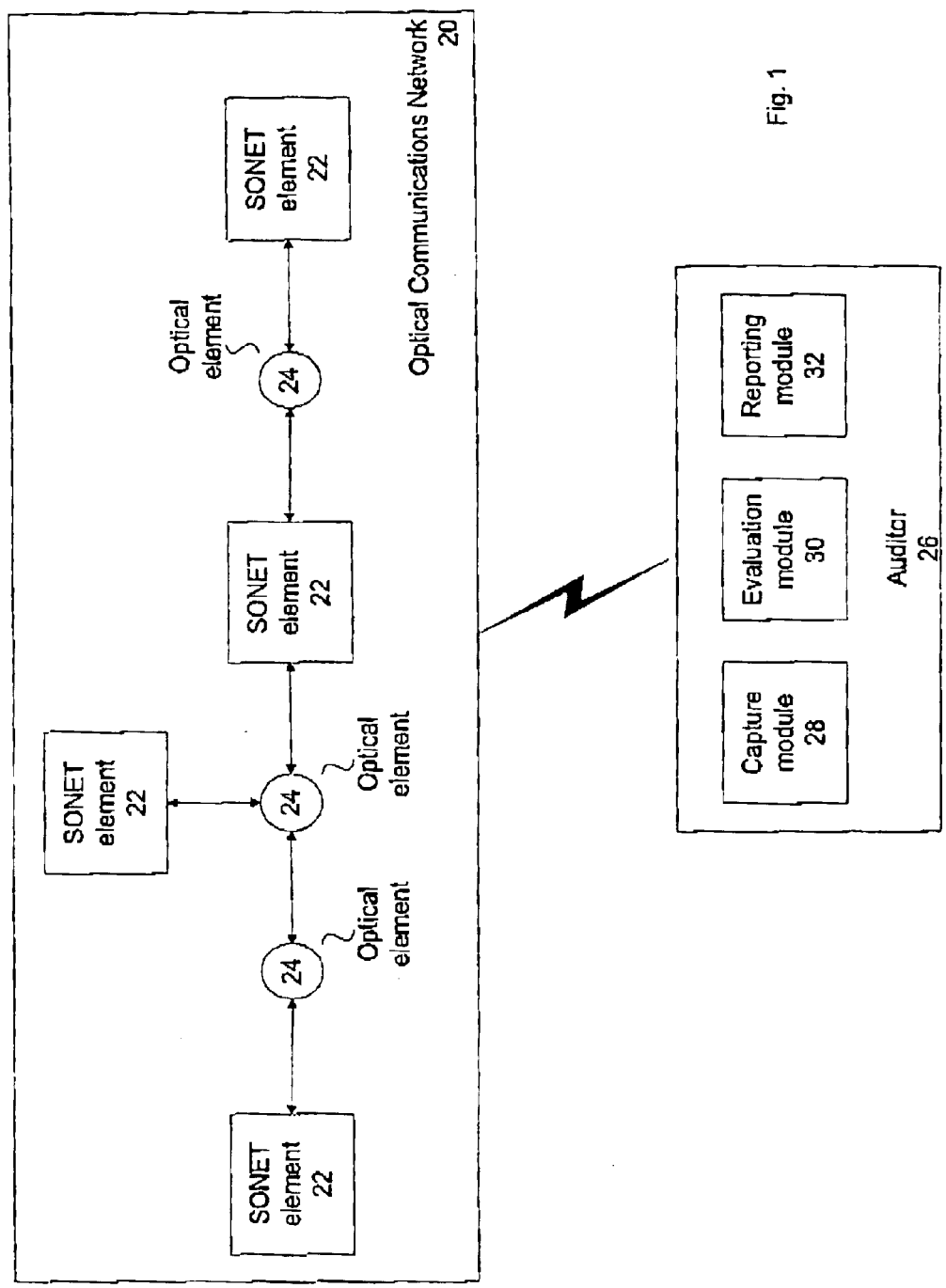
FIG. 1 is a block diagram of an optical communications network showing typical SONET and optical layer elements, connected to an auditor of the present invention.

FIG. 1 shows a typical optical communications network 20, including SONET network elements 22, and optical elements 24 that transport signals at the optical layer. An auditor 26 according to the present invention, is in communication with the optical communications network 20 via a serial connection, such as a modem connection. The SONET elements 22 can include regenerators, add/drop multiplexers (ADMs), line terminating equipment, dense regenerators, 4-fiber ring (4FR) ADMs, TMux network elements, etc. The optical elements 24 can include optical amplifiers, optical switches, etc.

In a presently preferred embodiment, the auditor 26 is a command line driven application program that can be run from an Xterm window or a DOS shell prompt. The auditor 26 is embodied as software residing on a general purpose, or other suitable, computer having memory means, a modem connection to a desired optical network, and standard peripherals such as a monitor, a printer, and input and output devices. The software embodying auditor 26 can be provided on any suitable computer-useable medium for execution by the computer, such as CD-ROM, hard disk, read-only memory, or random access memory. In a presently preferred embodiment, the application software is written in a suitable programming language, such as C++. Auditor 26 generally consists of a data capture module 28, an evaluation module 30, and a reporting module 32, the operation and interaction of which are described below.

Figure 2:
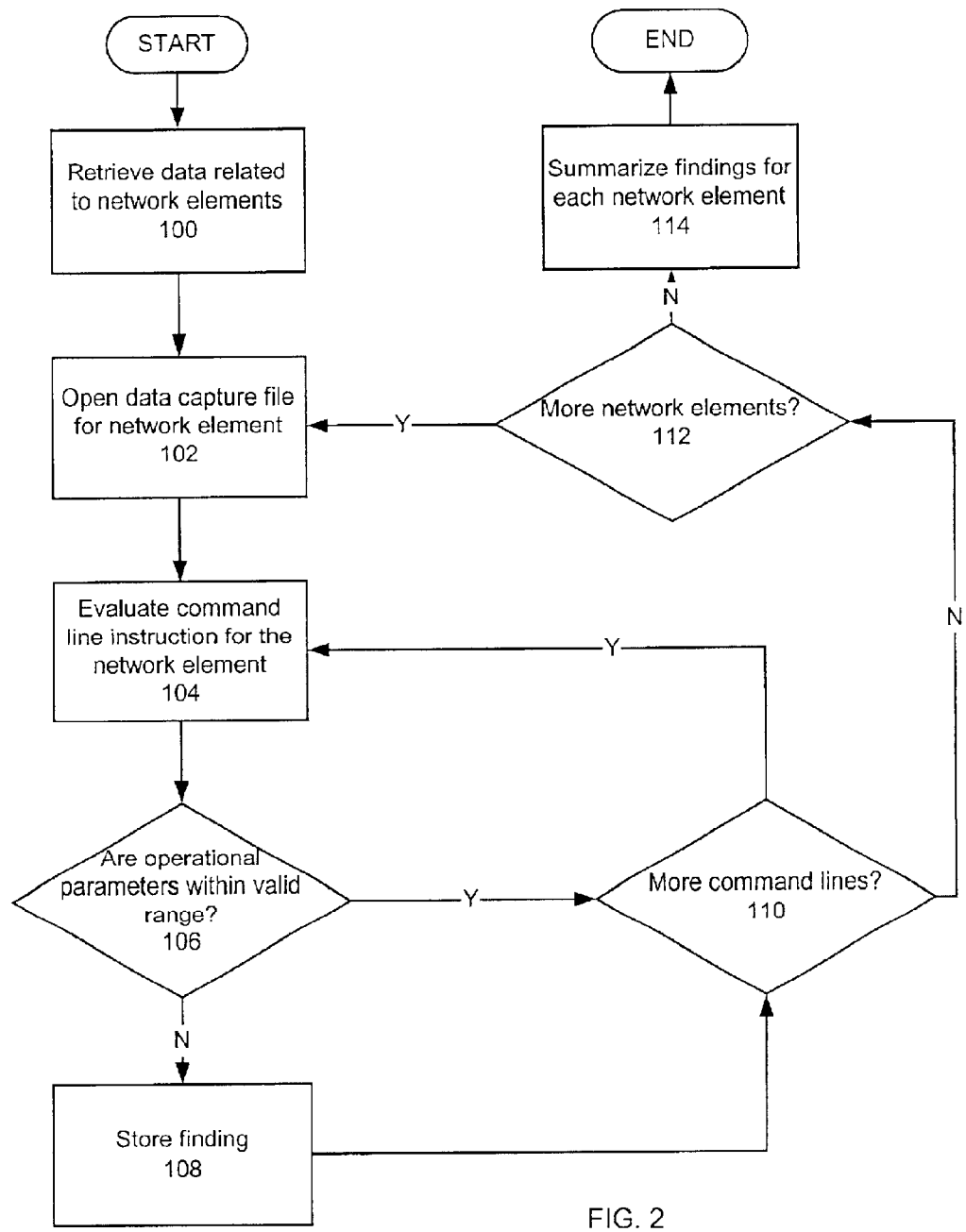
FIG. 2 is a flowchart illustrating the method of the present invention.

Referring to FIGS. 1 and 2, the general operation of the auditor 26 is shown. At step 100, the auditor 26 retrieves data concerning the operational parameters of network elements in a network of interest. The data can be captured directly by polling the network elements and the captured information stored in a data capture file, or it can be retrieved from static data capture files stored in a main network administrative directory location. The static data capture files are typically downloaded to the main administrative directory location at regular intervals, e.g. daily. The auditor 26 can, if desired, verify that the data capture files are of a valid type before continuing.

At step 102, the auditor 26 opens the data capture file for a given network element and reads it. While reading the network element data capture file, the auditor 26 determines if the line read is a valid network element command line instruction. If the line read is a valid network element command line instruction, the auditor 26 processes all of the information associated with that command, at step 104, according to the guidelines set out for the particular transport platform in applicable standards for the particular network element. The parameters evaluated at step 104 are next examined to determine if they are within expected ranges at step 106. Parameters that are outside the valid ranges are flagged as a "Finding", and written to a findings file for the network element at step 108, and then proceeds to the next command line, if any, at step 110. The result of each evaluation is flagged as "OK", for parameters that are within valid operating ranges, and the method proceeds to the next command line instruction at step 110. This process repeats from step 104 for each command line instruction for the network element. When the command line instructions for the particular network element have been exhausted, the auditor 26 determines if there are more network elements to examine, at step 112, and repeats steps 102 to 110 for each network element in turn. Once the auditor 26 determines that all of the network element data capture files have been examined, it summarizes all of the findings files and creates a findings summary file at step 114.

Figure 3:
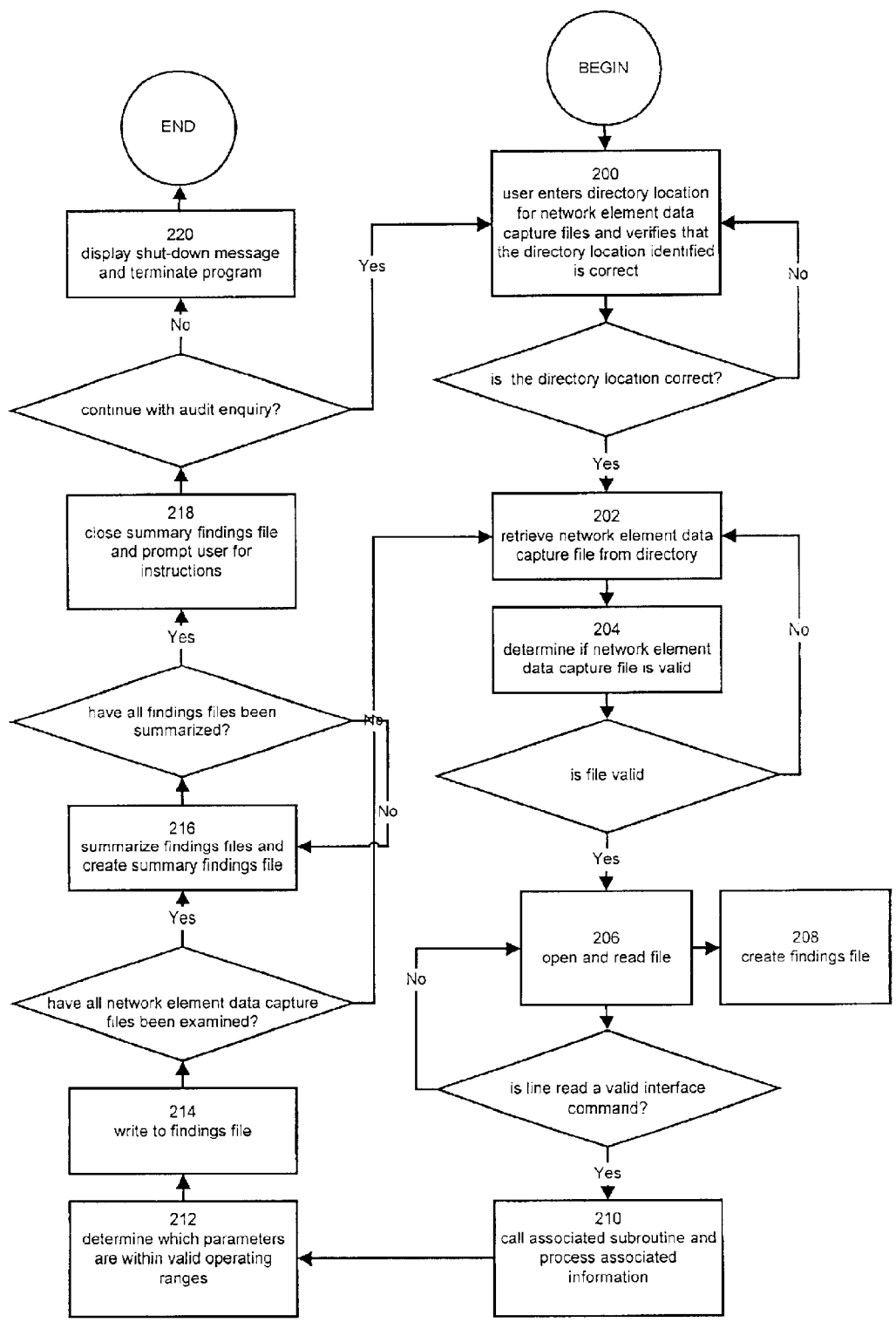
FIG. 3 is a flowchart of an embodiment of the method of FIG. 2.

Referring to FIGS. 1 and 3, the following is an example of the operation of the auditor 26 described above for an OC-192 network, such as the S/DMS TransportNode™ OC-192 system of Nortel Networks Limited. Upon prompting by the auditor 26, the user enters the directory location where the network element data files are located and the auditor 26 prompts the user to verify that the directory location is correct, as shown at step 200. If the directory location is not correct, the user is prompted to re-enter the directory location and verification is again requested. If the user replies affirmatively, the auditor 26 retrieves the network element data file from directory at step 202 and determines if a file located in the directory location specified by the user is a valid SONET network element data capture file, or some other unrelated file at step 204. This is done by, for example, examining the output stored in the CLUI eq ne qrne output, which accesses the card configuration within the shelf inventory of the network element. Although the network element may identified as a valid type, the configuration of the cards in the network element shelf may have been changed by the customer. The auditor 26 therefore uses the cards listed in the network element's shelf inventory to confirm the network element's functionality. For example, if the network element is identified as a regenerator, then the shelf inventory will be queried to determine if a circuit pack of type Rgn exists. If it is found to be an unrelated file, the auditor 26 ignores it and proceeds to retrieve the next network element data file. If the file is a valid network element data file, the utility then opens and reads the file at step 206.

The network auditor 26 then creates, at step 208, a findings file for the network element being examined. The evaluation results of the parameters collected from the network element data file are subsequently written to this findings file. While reading the network element data file, the auditor 26 determines if the line read is a valid network element user interface command. If the line read is a valid command line, the auditor 26 calls the subroutine associated with that particular command line instruction, and processes all of the information associated with that command according to the guidelines set out by the network audit specification for the particular transport platform, and determines which parameters are within valid operating ranges, as shown at steps 210 and 212. The result of the evaluation is flagged as "OK", for parameters that are within valid operating ranges, or "Finding", for parameters that are outside the valid ranges described and is written to the respective findings file at step 214.

After completing the analysis of the network element's captured operational data, the auditor 26 continues to open, read, evaluate and write the status of the results of the evaluation to the respective finding files for each of the network elements in the directory specified by the user. The auditor 26 determines whether all of the network element data files have been examined and if they have not, steps 202 to 212 are repeated. Once the auditor 26 determines that all of the network element data files have been examined, it creates a findings summary file at step 216.

The findings summary file is created by the auditor 26 opening each of the finding files created for the network elements evaluated, and determining if the status of the evaluation is listed as either "OK" or a "Finding". If the status of the evaluation is listed as "OK", the auditor 26 ignores this reported evaluation. If the status of the evaluation is listed as a "Finding", the evaluation result is copied to the finding summary file along with the data from the network element data file that shows the invalid parameter in-situ.

Once the auditor 26 has summarized the findings reported in each of the network element finding files, it closes the finding summary file, at step 218, and prompts the user, at step 220, to continue or terminate the audit. If the user indicates that be or she is finished using the auditor 26, the program is terminated. If the user indicates that he or she wants to continue using the auditor 26, the auditor 26 prompts the user to supply the location of the directory where the next set of network element data files are located and returns to step 200.

A typical summary findings report for a single network element, NE 30063, is shown at Appendix "A". As will be understood by those of skill in the art, a full summary findings report can include findings for a number of network elements, and can run to many pages. Typically, the summary findings report is displayed on an appropriate computer monitor, saved to a text file, and/or printed out as a hardcopy. The particular format of the summary findings report depends on the needs of the user. A graphical representation the summary findings report, as opposed to, or as a supplement to, the illustrated textual report, is also fully within the contemplation of the inventors. Such a graphical representation would provide the user with a visual identification of malfunctioning network elements, and could use colours or other indicators to identify particular invalid operational parameters.

Briefly, the illustrated summary findings report includes an identification of the network element in question, including, for example, its address and location within the network, and then displays each finding for the network element, as determined by the auditor 26. The display of the finding includes details of the invalid operational parameters detected for the finding, and a finding status that summarizes the detected error condition and provides an indication of the expected valid operational range for the given operational parameter. For example, looking at the first page of Appendix "A", the finding status for a first operational parameter morf pwrm disptpgll red is displayed as "LOS threshold value −20 is not 3 to 4 dB below the total input power value −11.9 and is invalid". The details of the finding are presented in tabular form, as appropriate to the particular operational parameter. Findings for each flagged operational parameter are presented, in turn, in the report.

As will be understood by those of skill in the art, the auditor of the present invention permits users, such as product support personnel and field support personnel, to quickly generate an audit report for a network. The comprehensive nature of the report, as well as the fact that only findings for network elements that have an identified abnormality are presented, means that a user can quickly pinpoint problem areas in the network, and, due to the organized and uniform manner in which the information is presented, likely determine the root cause of the problems. The present auditor can also be used to screen networks prior to reconfigurations or upgrades to permit deficiencies to be corrected prior to the reconfiguration. In this way, it is more likely that any network reconfiguration will proceed smoothly.

In tests on data capture files for an OC-192 network, the auditor of the present invention has been found capable of analyzing a single network element in less than seven seconds. This is compared to an average of forty minutes that it would take an experienced engineer to analyze the same operational data to determine if the element is working within established operational bounds. Thus the present auditor provides a nearly 350 times performance increase, and eliminates human error.

The auditor of the present invention can also be used for training purposes to permit users to become familiar with the operation of a network and to see the types of problems that can occur.

The auditor can also, if desired, be incorporated with other network system tools, such as a network plotter, to provide a comprehensive package for network management.

The above-described embodiments of the present invention are intended to be examples only. Alterations, modifications and variations may be effected to the particular embodiments by those of skill in the art without departing from the scope of the invention, which is defined solely by the claims appended hereto.

APPENDIX A

Example Summary findings report

NETWORK AUDIT FINDING SUMMARY
*** 30063 * 30063 * 30063 * 30063 * 30063 * 30063 ***
Status: Finding - OPC server address is undefined.
Status: Finding - OPC server directory value undefined is invalid.
NE 30063> showserver
Server Address:      undefined
Server Directory:    undefined
Status: Finding - LOS threshold value −20 is not 3 to 4 dB below the total input power value −11.9 and is invalid.
NE 30063> morf pwrm disptp g11 red
Shelf: 2    Slot: 12    Unit. MOR G11

| Power Measurements | Red Band (1547.50–1561.00 nm) | | | |
|---|---|---|---|---|
| | Current | | (Last) | |
| | dBm | % | (dBm | %) |
| Input Red Power | −12.9 | 78 | (− | −) |
| Reflected Blue Power | −19.3 | 18 | (− | −) |
| Input OSC Power | −25.7 | 4 | (− | −) |
| Total Input Power | −11.9 | 100 | (− | −) |
| Output Red Power | 10.2 | 93 | (− | −) |
| Output OSC Power | −0.7 | 7 | (− | −) |
| Input Blue Power | −13.1 | 87 | (− | −) |
| Reflected Red Power | −21.7 | 12 | (− | −) |
| Reflected OSC Power | −32.7 | 1 | (− | −) |
| Total Input Power | −12.5 | 100 | (− | −) |
| Total Output Power | 10.3 | 100 | (− | 100) |

Input LOS Threshold =     −20 dBm
Input Shut-off Threshold =    −26 dBm
Blue Input/Red Output Optical Reflectometer = Enabled
Last saved at 00:00    00/00/00
Press CR to return to menu
Status: Finding - LOS threshold value −20 is not 3 to 4 dB below the total input power value −11.3 and is invalid.
NE 30063>morf pwrm disptp g12 red
Shelf: 2    Slot: 13    Unit: MOR G12

| Power Measurements | Red Band (1547.50–1561.00 nm) | | | |
|---|---|---|---|---|
| | Current | | (Last) | |
| | dBm | % | (dBm | %) |

Shelf: 2    Slot: 13    Unit: MOR G12

| Power Measurements | Blue Band (1528.40–1542.50 nm) | | | |
|---|---|---|---|---|
| | Current | | (Last) | |
| | dBm | % | (dBm | %) |
| Input Blue Power | −14.0 | 85 | (− | −) |
| Reflected Red Power | −21.9 | 14 | (− | −) |
| Reflected OSC Power | −33.0 | 1 | (− | −) |

APPENDIX A-continued

Example Summary findings report

| | | | | |
|---|---|---|---|---|
| Total Input Power | −13.3 | 100 | | (− −) |
| Total Output Power | 10.6 | 100 | | (− 100) |
| Input LOS Threshold = | −20 dBm | | | |
| Input Shut-off Threshold = | −26 dBm | | | |
| Blue Input/Red Output Optical Reflectometer = Enabled | | | | |

Last saved at 00:00 00/00/00
Press CR to return to menu
Status: Finding - Save value 00:00 00/00/00 invalid.
NE 30063> morf pwrm dispch g11 red
Shelf: 2   Slot: 12   Unit: MOR G11

Red Band (1547.50–1561.00 nm)

Shelf: 2   Slot: 12   Unit: MOR G11
Blue Band (1528.40–1542.50 nm)

| | Input Power | | | Output Power | | |
|---|---|---|---|---|---|---|
| | Current | | (Last) | Current | | (Last) |
| Ch Tx - Wavelength | dBm | % | (dBm %) | dBm | % | (dBm %) |
| 1 OC-192 DWDMTx 1533.47 | −13.3 | 82 | (− −) | 10.1 | 95 | (− −) |
| 2 - | − | − | (− −) | − | − | (− −) |
| 3 - | − | − | (− −) | − | − | (− −) |
| 4 - | − | − | (− −) | − | − | (− −) |
| OSC | − | − | (− −) | − | − | (− −) |
| Reflected Red | −21.7 | 12 | (− −) | | | |
| Reflected OSC | −32.8 | 1 | (− −) | | | |
| Residual | −25.6 | 5 | (− −) | −2.5 | 5 | (− −) |
| Total | −12.5 | 100 | (− −) | 10.3 | 100 | (− −) |

Last saved at 00:00 00/00/00
Press CR to return to menu
Status: Finding - Save value 00:00 00/00/00 invalid.
NE 30063> morf pwrm dispch g12 red
Shelf: 2   Slot: 13   Unit: MOR G12
NE 30063> morf pwrm dispch g12 blue
Shelf: 2   Slot: 13   Unit: MOR G12

Blue Band (1528.40–1542.50 nm)

| | Input Power | | | Output Power | | |
|---|---|---|---|---|---|---|
| | Current | | (Last) | Current | | (Last) |
| Ch Tx - Wavelength | dBm | % | (dBm %) | dBm | % | (dBm %) |
| 1 OC-192 DWDMTx 1533.47 | −14.4 | 78 | (− −) | 10.2 | 91 | (− −) |
| 2 - | − | − | (− −) | − | − | (− −) |
| 3 - | − | − | (− −) | − | − | (− −) |
| 4 - | − | − | (− −) | − | − | (− −) |
| OSC | − | − | (− −) | − | − | (− −) |
| Reflected Red | −21.9 | 14 | (− −) | | | |
| Reflected OSC | −33.0 | 1 | (− −) | | | |
| Residual | −25.2 | 7 | (− −) | 0.3 | 9 | (− −) |
| Total | −13.4 | 100 | (− −) | 10.6 | 100 | (− −) |

Last saved at 00:00 00/00/00
Press CR to return to menu
Status: Finding - Current saved hour 00:00 and current saved date 00/00/00 are invalid.
Status: Finding - Last saved hour 00:00 and last saved date 00/00/00 are invalid.

| Optical Reflectometer | Red In/Blue Out | | Blue In/Red Out | |
|---|---|---|---|---|
| | Current | (Last) | Current | (Last) |
| Output Optical Return Loss | 30.4 dB | (−dB) | 32.1 dB | (−dB) |
| Optical Return Loss Threshold | 24 dB | | 24 dB | |
| Optical Reflectometer State | Enabled | | Enabled | |
| Last Saved at | 00:00 00/00/00 | | 00:00 00/00/00 | |

Press CR to return to menu
Status: Finding - Alarm log record created in the last 48 hours.
NE 30063> ad 11r EQP*

| Type | Date | Time | Count | Description |
|---|---|---|---|---|
| EQP421 | 01/03/99 | 13/57/44 | 5 | Card Insert |
| EQP422 | 01/03/99 | 13/52/57 | 3 | Card Remove |

APPENDIX A-continued

Example Summary findings report

| | | | | |
|---|---|---|---|---|
| EQP401 | 01/03/99 | 13/37/36 | 20 | Create/Delete |
| EQP403 | 00/00/00 | 00/00/00 | 0 | Data Change |
| EQP501 | 00/00/00 | 00/00/00 | 0 | CPG Primary state change |
| EQP323 | 00/00/00 | 00/00/00 | 0 | INFO Protection Activity |
| EQP410 | 05/05/99 | 05/05/55 | 66 | Audit Report |
| EQP411 | 00/00/00 | 00/00/00 | 0 | Audit Report |
| EQP405 | 00/00/00 | 00/00/00 | 0 | EQP MX protection exerciser result |
| EQP616 | 00/00/00 | 00/00/00 | 0 | Reconfiguration Operation Success |
| EQP316 | 00/00/00 | 00/00/00 | 0 | Reconfiguration Operation Failed |

| | | | |
|---|---|---|---|
| 5 | Entry to 20 ppm freerun | On | On |
| 6 | Filler card missing | On | Off |
| 7 | Autoprovisioning mismatch | On | On |
| 8 | Duplicate NE name | On | On |
| 9 | Duplicate NE ID | On | On |
| 10 | NE approval required | On | On |
| 11 | Number of level 1 NEs exceeded | On | On |
| 12 | MI port intrusion attempt | On | On |
| 13 | LCAP port intrusion attempt | On | On |
| 14 | Serial number inconsistency | On | On |
| 15 | Mismatched switch types | On | On |
| 16 | Shelf autoprovisioning mismatch | On | On |
| 17 | MX exerciser fail | On | On |
| 18 | Manual area address dropped from area | On | On |
| 19 | PM day MS/line/RS/section threshold | On | On |
| 20 | PM 15 min MS/line/RS/section threshold | On | On |
| 21 | PM 15 min path threshold | On | On |
| 22 | PM day path threshold | On | On |
| 23 | PM physical TCA | On | On |
| 24 | Protection path fail | On | On |
| 25 | Fan 1 fail | On | On |
| 26 | Fan 2 fail | On | On |
| 27 | Fan 3 fail | On | On |
| 28 | High shelf temperature | On | On |
| 29 | Low shelf voltage | On | On |
| 30 | Fan 1 missing | On | On |
| 31 | Fan 2 missing | On | On |
| 32 | Fan 3 missing | On | On |
| 33 | Breaker filter A fail | On | On |

What is claimed is:

1. A method of auditing an optical communications network to determine operational states of network elements, comprising:
   (i) retrieving operational data from a plurality of network elements;
   (ii) evaluating the operational data to determine an operational parameter for a given network element;
   (iii) determining if the operational parameter is invalid by comparing the operational parameter with a corresponding predetermined operational specification for the given network element and flagging the invalid operational parameter;
   (iv) repeating steps (ii) and (iii) for remaining operational parameters specified for the given network element;
   (v) repeating steps (ii) to (iv) for each of the plurality of network elements; and
   (vi) generating a findings report for the plurality of network elements, the findings report listing any of the plurality of network elements determined to have at least one invalid operational parameter, displaying details of the at least one invalid operational parameter, and providing a finding status for the at least one invalid operational parameter.

2. The method according to claim 1, wherein retrieving the data includes polling the plurality of network elements via a serial connection.

3. The method according to claim 1, wherein retrieving the data includes reading static data capture files.

4. The method according to claim 1, wherein evaluating the operational data includes processing a network interface command line for the given network element.

5. The method according to claim 4, wherein determining if the operational parameter is invalid includes determining that the operational parameter is outside predetermined valid operating ranges.

6. A method of auditing a synchronous optical network to identify malfunctioning network elements, comprising:
   a) entering a directory location for network element data files;
   b) retrieving a network element data file for a given network element from the directory location;
   c) verifying that the network element data file is valid;
   d) opening the network element data file and reading a network interface command line;
   e) verifying that the network interface command line is valid;
   f) processing the network interface command line to determine if operational parameters for the given network element are outside valid predetermined operating ranges by comparing each operational parameter with a corresponding predetermined operational specification for the given network element;
   g) creating a network element findings file for findings of operational parameters that are outside said valid predetermined operating ranges;
   h) repeating steps a) to g) for all network element data files in said network to create a findings file for each network element; and (i) creating a summary findings file and writing said network element findings files to the summary findings file to provide a report listing any of the plurality of network elements determined to have findings, displaying details of the findings, and providing a finding status for each finding.

7. A computer program product for auditing an optical communications network to determine operational states of network elements, comprising:

a computer-useable medium;

a data capture module stored on the computer-useable medium for retrieving operational data from a plurality of network elements via a serial connection, and for storing the operational data in data capture files;

an evaluation module communicatively coupled to the data capture module for evaluating the operational data to determine operational parameters for the plurality of network elements, for determining if the determined operational parameters are invalid by comparing each operational parameter with a corresponding predetermined operational specification for the given network element, and for flagging the invalid operational parameters; and a reporting module communicatively coupled to the evaluation module for generating a findings report for the plurality of network elements, the findings report listing any of the plurality of network elements determined to have at least one invalid operational parameter, displaying details of the at least one invalid operational parameter, and providing a finding status for the at least one invalid operational parameter.

8. The computer program product according to claim 7, wherein the data capture module includes means for polling the plurality of network elements by modem connection.

9. The computer program product according to claim 7, wherein the data capture module includes means for reading static data capture files.

10. The computer program product according to claim 7, wherein the evaluation module includes means for processing network interface command lines for each of the plurality of network elements.

11. The computer program product according to claim 7, wherein the evaluation module includes means for comparing the operational parameters to predetermined valid operating ranges.

12. A computer program product residing on a computer-useable medium for auditing a synchronous optical network to identify malfunctioning network elements, comprising:

means for entering a directory location for network element date files;

means for retrieving a network element data file for a given network element from the directory location;

means for verifying that the network element data file is valid;

means for opening the network element data file and reading a network interface command line;

means for verifying that the network interface command line is valid;

means for processing the network interface command line to determine if operational parameters for the given network element are outside valid predetermined operating ranges by comparing each operational parameter with a corresponding predetermined operational specification for the given network element;

means for creating a network element findings file for findings of operational parameters that are outside said valid predetermined operating ranges;

means for creating a summary findings file and writing network element findings files for each of the plurality of network elements to said summary findings file to provide a report listing any of the plurality of network elements determined to have findings, displaying details of the findings, and providing a finding status for each finding.

13. An auditor for auditing an optical communications network to determine operational states of network elements, comprising:

a serial connection for communicating with a plurality of network elements in an optical communications network;

a data capture module for retrieving operational data from the plurality of network elements via the modem, and for storing the operational data in data capture files;

an evaluation module for evaluating the operational data to determine operational parameters for the plurality of network elements, for determining if the determined operational parameters are invalid by comparing each operational parameter with a corresponding predetermined operational specification for the given network element, and for flagging the invalid operational parameters; and a reporting module for generating a findings report for the plurality of network elements, the findings report listing any of the plurality of network elements determined to have at least one invalid operational parameter, displaying details of the at least one invalid operational parameter, and providing a finding status for the at least one invalid operational parameter.

14. The auditor according to claim 13, wherein the data capture module includes polling means for polling the plurality of network elements.

15. The auditor according to claim 13, wherein the evaluation module includes means for processing network interface command lines for each of the plurality of network elements.

16. The auditor according to claim 13, wherein evaluation module includes means for comparing the operational parameters to predetermined valid operating ranges.

* * * * *